(12) United States Patent
Miyairi et al.

(10) Patent No.: US 11,125,131 B2
(45) Date of Patent: Sep. 21, 2021

(54) HEAT GENERATION SYSTEM, EXHAUST GAS PURIFICATION DEVICE, AND METHOD FOR REGENERATING HONEYCOMB STRUCTURE

(71) Applicant: NGK Insulators, Ltd., Nagoya (JP)

(72) Inventors: Yukio Miyairi, Nagoya (JP); Shinichi Miwa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 30 days.

(21) Appl. No.: 16/445,605

(22) Filed: Jun. 19, 2019

(65) Prior Publication Data
US 2019/0301331 A1     Oct. 3, 2019

Related U.S. Application Data

(63) Continuation of application No. PCT/JP2017/038876, filed on Oct. 27, 2017.

(30) Foreign Application Priority Data

Jan. 17, 2017   (JP) .............................. JP2017-005718

(51) Int. Cl.
*F01N 3/022*     (2006.01)
*F01N 3/20*      (2006.01)
(Continued)

(52) U.S. Cl.
CPC ........... *F01N 3/2006* (2013.01); *B01D 53/94* (2013.01); *B01D 53/96* (2013.01); *F01N 3/022* (2013.01);
(Continued)

(58) Field of Classification Search
CPC .......... F01N 3/2006; F01N 3/24; F01N 3/022; F01N 3/023; F01N 2240/02;
(Continued)

(56) References Cited

U.S. PATENT DOCUMENTS

| | | | | |
|---|---|---|---|---|
| 5,653,106 A | * | 8/1997 | Katashiba | ........... F28D 20/0034 60/300 |
| 8,951,475 B2 | * | 2/2015 | Komaki | ................ F28D 20/003 422/111 |

(Continued)

FOREIGN PATENT DOCUMENTS

| | | | |
|---|---|---|---|
| JP | S59-208118 A1 | 11/1984 | |
| JP | 05125929 A | * 5/1993 | ........... F01N 3/2006 |

(Continued)

OTHER PUBLICATIONS

Accuratus; "Silicon carbide, SiC Ceramic Properties"; 2013; (https://accuratus.com/silicar.html).*

(Continued)

*Primary Examiner* — Matthew T Largi
(74) *Attorney, Agent, or Firm* — Burr & Brown, PLLC (57) ABSTRACT

A heat generation system including: a liquid storage tank; a heating element including: a reaction container having a storage space, and a porous body stored in the storage space, and loaded with an exothermic reaction solid that causes an exothermic reaction when being in contact with the liquid; a liquid injection mechanism member including: a liquid flow pipe that communicates between the liquid storage tank and the storage space of the reaction container, through which the liquid flows, and an injection unit that injects the liquid into the storage space; and discharge mechanism member including: a discharge pipe that communicates with the storage space of the reaction container, and a discharge unit that discharges a liquid product generated by the exothermic reaction caused by contact between the liquid and the exothermic reaction solid, and a vaporized material of the liquid, from the storage space through the discharge pipe.

16 Claims, 5 Drawing Sheets

(51) Int. Cl.
*F01N 3/023* (2006.01)
*F28D 20/00* (2006.01)
*B01D 53/96* (2006.01)
*B01D 53/94* (2006.01)
*F01N 3/24* (2006.01)
*F24V 30/00* (2018.01)

(52) U.S. Cl.
CPC ............... *F01N 3/023* (2013.01); *F01N 3/24* (2013.01); *F28D 20/003* (2013.01); *F24V 30/00* (2018.05)

(58) Field of Classification Search
CPC ..... F01N 2240/12; B01D 53/96; B01D 53/94; F28D 20/003; F24V 30/00
See application file for complete search history.

(56) References Cited

U.S. PATENT DOCUMENTS

| | | | |
|---|---|---|---|
| 9,528,489 B2 * | 12/2016 | Alfano | F02N 19/10 |
| 10,077,696 B2 * | 9/2018 | Gaiser | F01N 3/006 |
| 2003/0148063 A1 | 8/2003 | Morimoto et al. | |
| 2005/0143255 A1 | 6/2005 | Morimoto et al. | |
| 2008/0307781 A1 * | 12/2008 | Gonze | F01N 3/027 60/320 |
| 2011/0162352 A1 * | 7/2011 | Svensson | F01N 9/002 60/297 |
| 2012/0017569 A1 * | 1/2012 | Gaiser | F28D 7/106 60/274 |
| 2012/0251394 A1 | 10/2012 | Komaki et al. | |

FOREIGN PATENT DOCUMENTS

| | | |
|---|---|---|
| JP | H05-321633 A1 | 12/1993 |
| JP | 4111439 B2 | 7/2008 |
| JP | 4227347 B2 | 2/2009 |
| JP | 2011-058678 A1 | 3/2011 |
| JP | 2012-026447 A1 | 2/2012 |
| JP | 2012-215324 A1 | 11/2012 |
| JP | 2013-234625 A1 | 11/2013 |
| JP | 2014-234706 A1 | 12/2014 |

OTHER PUBLICATIONS

International Search Report and Written Opinion (Application No. PCT/JP2017/038876) dated Dec. 26, 2017.

\* cited by examiner

HEAT GENERATION SYSTEM, EXHAUST GAS PURIFICATION DEVICE, AND METHOD FOR REGENERATING HONEYCOMB STRUCTURE

TECHNICAL FIELD

The present invention relates to a heat generation system, an exhaust gas purification device, and a method for regenerating a honeycomb structure, and more specifically, a heat generation system of chemically heating a fluid such as liquid or gas, by using reaction heat of an exothermic reaction caused by contact between liquid and an exothermic reaction solid, an exhaust gas purification device having a function of performing regeneration treatment of a honeycomb structure having the heat generation system, and a method for regenerating a honeycomb structure having the exhaust gas purification device.

BACKGROUND ART

In recent years, for example, a honeycomb-shaped porous body (honeycomb structure) provided with partition walls defined and formed by a plurality of cells is manufactured using a ceramic porous material, and is used as a material for a catalyst carrier, DPF (diesel particulate filter), or the like. In addition, an exhaust gas purification device using such a honeycomb structure is constructed (see, for example, Patent Documents 1 and 2). With this exhaust gas purification device, particulate matter (PM) in exhaust gas emitted from a diesel engine can be removed, and exhaust gas purification treatment conforming to various regulations and emission standards can be performed.

CITATION LIST

Patent Documents

[Patent Document 1] JP-B2-4111439
[Patent Document 2] JP-B2-4227347

SUMMARY OF THE INVENTION

Problem to be Solved by the Invention

DPF has a plugging portion in which one end face and the other end face of a honeycomb structure are plugged with a predetermined arrangement standard. Therefore, when the particulate matter is continuously removed by an exhaust gas purification device adopting the DPF, the particulate matter deposits inside the DPF.

In the state where a large amount of such particulate matter is deposited, purification efficiency is lowered, and a pressure loss of a fluid (exhaust gas) is increased between the one end face and the other end face. Therefore, it is necessary to perform "regeneration treatment" of disposing an oxidation catalyst in a fore stage of the DPF and supplying fuel to the oxidation catalyst to generate oxidation heat, supplying combustion gas heated to a high temperature to the DPF in a hind stage, and burning the deposited particulate matter, at a predetermined frequency. Therefore, the exhaust gas purification device is provided with a function for performing such regeneration treatment.

Here, even when the high temperature combustion gas is supplied to the DPF, a temperature rise of the DPF sometimes take time because the DPF itself has a heat capacity. Therefore, there is a possibility that combustion efficiency (regeneration efficiency) of the particulate matter is lowered. Furthermore, addition of a heating device for raising the temperature of the combustion gas at an inlet of the DPF sometime causes increase in size or weight of the exhaust gas purification device itself, or complicated control is sometimes required for heating.

Therefore, in view of the above situation, an object of the present invention is to provide a heat generation system that can be compactly formed with a relatively simple configuration, an exhaust gas purification device that can perform regeneration treatment of a honeycomb structure having the heat generation system, and a method for regenerating a honeycomb structure having an exhaust gas purification device.

Means for Solving the Problem

In order to solve the above-mentioned problem, the present invention provides a heat generation system, an exhaust gas purification device, and a method for regenerating a honeycomb structure as follows.

According to a first aspect of the present invention, a heat generation system including a liquid storage tank being configured to store; a heating element including: a reaction container having a storage space inside the container, and a porous body stored in the storage space, and loaded with an exothermic reaction solid that causes an exothermic reaction when being in contact with the liquid; a liquid injection mechanism member including: a liquid flow pipe that communicates between the liquid storage tank and the storage space of the reaction container, through which the liquid flows, and an injection unit that injects the liquid in the liquid storage tank into the storage space; and a discharge mechanism member including: a discharge pipe that communicates with the storage space of the reaction container, and a discharge unit that discharges a liquid product generated by the exothermic reaction caused by contact between the liquid and the exothermic reaction solid, and a vaporized material of the liquid, from the storage space through the discharge pipe.

According to a second aspect of the present invention, the heat generation system according to the above first aspect is provided, further including a liquefying unit that cools the discharged vaporized material to cause phase transition to the liquid; and a liquid recovery unit that recovers the liquefied liquid in the liquid storage tank.

According to a third aspect of the present invention, the heat generation system according to the above first or second aspects is provided, wherein the reaction container is composed of a double tube structure having: an inner cylindrical portion, and an outer cylindrical portion provided separately on the outer side of the inner cylindrical portion, and the storage space is provided between the inner cylindrical portion and the outer cylindrical portion.

According to a fourth aspect of the present invention, the heat generation system according to any of the above first to third aspects is provided, wherein the exothermic reaction solid is an alkaline earth metal element oxide or a mixture of a plurality of the alkaline earth metal element oxides.

According to a fifth aspect of the present invention, the heat generation system according to the above fourth aspect is provided, wherein the alkaline earth metal element oxide is a calcium oxide, and the liquid is water.

According to a sixth aspect of the present invention, the heat generation system according to any of the above first to fifth aspects is provided, wherein the porous body is made of a ceramic material containing silicon and silicon carbide as main components.

According to a seventh aspect of the present invention, the heat generation system according to the above third aspect is provided, further including a heat exchange unit that at least partially abuts against an inner peripheral surface of the inner cylindrical portion of the reaction container, and is configured transfer reaction heat generated by the exothermic reaction to the outside of the heating element.

According to an eighth aspect of the present invention, the heat generation system according to the above seventh aspect is provided, wherein the heat exchange unit is a honeycomb heat exchange unit having partition walls defining a plurality of cells, the plurality of cells extending from one end face to the other end face to form a flow path of fluid.

According to a ninth aspect of the present invention, an exhaust gas purification device having the heat generation system according to any of the above first to eighth aspects is provided, including: a honeycomb structure having partition walls defining a plurality of cells, the plurality of cells extending from one end face to the other end face to form a flow of fluid; a metal can body having a structure accommodation space capable of accommodating the honeycomb structure therein; and the heat generation system in which the heating element is disposed at an upstream position of the structure accommodation space, facing the one end face, wherein the exhaust gas purification device having a regeneration function of introducing the fluid heated by the heating element from the one end face into the honeycomb structure, and removing particulate matter deposited inside the structure by the fluid.

According to a tenth aspect of the present invention, an exhaust gas purification device having the heat generation system according to any of the above first to eighth aspects is provided, including a honeycomb structure having partition walls defining a plurality of cells, the plurality of cells extending from one end face to the other end face to form a flow path of fluid; a metal can body having a structure accommodation space capable of accommodating the honeycomb structure therein; and the heat generation system in which the heating element is disposed so that the heating element at least partially abuts against an outer surface of an outer shell portion of a can body outer shell portion of the can body, or is partially embedded in the can body outer shell portion, wherein the exhaust gas purification device having a regeneration function of introducing the fluid from the one end face of the honeycomb structure heated by the heating element through the can body into the honeycomb structure and removing particulate matter deposited inside the structure by the fluid.

According to an eleventh aspect of the present invention, the exhaust gas purification device according to the above ninth or tenth aspects is provided, wherein the honeycomb structure is a plugged honeycomb structure including a plurality of plugging portions in which open ends of the cells in the one end face and/or the other end face are plugged in accordance with a predetermined arrangement standard.

According to a twelfth aspect of the present invention, the exhaust gas purification device according to any of the above ninth to eleventh aspects is provided, wherein the honeycomb structure is loaded with at least one catalyst of a selective reduction catalyst, a three-way catalyst, and a $NO_x$ storage type three-way catalyst on the surface of the partition wall and/or inside the partition wall.

According to a thirteenth aspect of the present invention, the exhaust gas purification device according to the above tenth aspect is provided, further including a heat conduction unit interposed between the honeycomb structure and the can body and formed of a thermally conductive material that transfers reaction heat generated by the heating element provided in the can body outer shell portion to the honeycomb structure.

According to a fourteenth aspect of the present invention, a method for regenerating a honeycomb structure having the exhaust gas purification device according to any of the above ninth to thirteenth aspects is provided, the method including a fluid introducing step of introducing fluid from the one end face into the honeycomb structure; a fluid heating step of heating the fluid before being introduced into the honeycomb structure, using the heat generation system of the exhaust gas purification device; and a regeneration treatment step of removing particulate matter deposited inside the structure by the heated fluid to regenerate the honeycomb structure.

According to a fifteenth aspect of the present invention, a method for regenerating a honeycomb structure having the exhaust gas purification device according to any of the above ninth to thirteenth aspects is provided, the method including a fluid introducing step of introducing fluid from the one end face into the honeycomb structure accommodated in a metal can body; a honeycomb structure heating step of heating the honeycomb structure through the can body, using the heat generation system of the exhaust gas purification device; and a regeneration treatment step of removing particulate matter deposited inside the structure by the heated honeycomb structure and the fluid to regenerate the honeycomb structure.

According to a sixteenth aspect of the present invention, the method for regenerating a honeycomb structure according to the above fourteenth or fifteenth aspects is provided, wherein heating of the fluid or the honeycomb structure by the heat generation system is started simultaneously with the start of introduction of the fluid into the structure or before the start of introduction.

Effect of the Invention

According to the heat generation system of the present invention, it is possible to cause an exothermic reaction with a relatively simple configuration in which a liquid and an exothermic reaction solid are brought into contact with each other, and to heat an object such as a fluid using the reaction heat. In regeneration treatment of a honeycomb structure in the exhaust gas purification device with this heat generation system, a fluid (diesel fuel) is preheated and then introduced into the honeycomb structure or the honeycomb structure is heated, thereby efficiency of the regeneration treatment can be increased. Furthermore, according to the method for regenerating a honeycomb structure, regeneration treatment of the honeycomb structure can be stably performed, by using the exhaust gas purification device.

MODE FOR CARRYING OUT THE INVENTION

Hereinafter, an embodiment of a heat generation system of an embodiment of the present invention, an exhaust gas purification device having the heat generation system, and a method for regenerating a honeycomb structure used in an exhaust gas purification device will be described with reference to the drawings. The heat generation system, the exhaust gas purification device, and the method for regenerating a honeycomb structure of the present invention are not limited to the following embodiments, and various changes, modifications, improvements and the like in design may be added without departing from the gist of the present invention.

Figure 1:
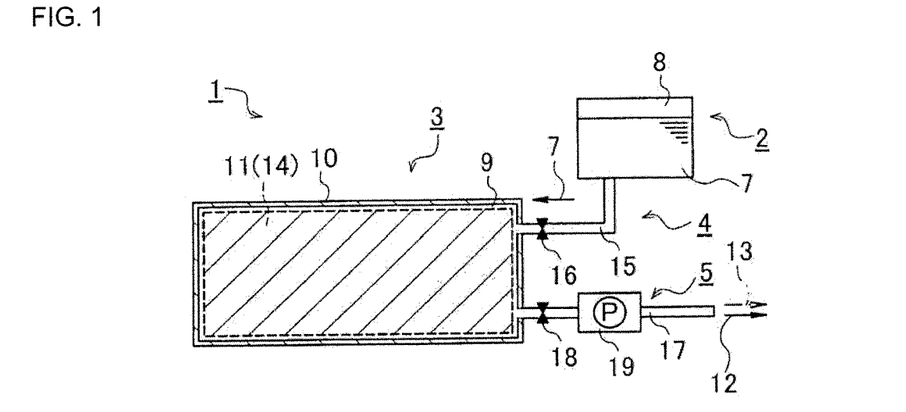
FIG. 1 is a schematic diagram showing a schematic configuration of a heat generation system of a present embodiment.

(1) Heat Generation System:

As shown in FIG. 1, the heat generation system 1 of the embodiment of the present invention mainly includes a liquid storage tank 2, a heating element 3, a liquid injection mechanism member 4, and a discharge mechanism member 5. With the heat generation system 1 of the present embodiment, the heating element 3 can be heated to a high temperature by utilizing a chemical exothermic reaction, and the heat can be transferred to the outside through the heating element 3. As a result, the heat generation system 1 of the present embodiment can be used to heat various fluids.

In detail for the above configuration, the liquid storage tank 2 is for temporarily storing liquid 7 for causing an exothermic reaction by the heating element 3, and is provided with a liquid storage space 8 for storing a predetermined amount of the liquid 7 therein. Here, for example, water can be used as the liquid 7 stored in the liquid storage tank 2. By using water, handling of the liquid 7 in the heat generation system 1 is facilitated, and it is possible to reduce cost when constructing or operating the heat generation system 1.

The water to be used is not particularly limited, and distilled water, ion-exchanged water or the like may be used, in addition to normal clean water. Furthermore, the material constituting the liquid storage tank 2 is not also specifically limited, and one constituted with materials such as metal and resin from which the liquid 7 does not leak can be used.

On the other hand, the heating element 3 mainly includes a reaction container 10 of a hollow structure having a storage space 9 inside the container, and a porous body 11 accommodated in the storage space 9. Here, the reaction container 10 can be mainly made of a metal material such as stainless steel or iron, and has a liquid-tight structure in which the liquid 7 does not leak even when the liquid 7 in the liquid storage tank 2 is injected into the storage space 9 and filled.

Furthermore, it is necessary to have a certain pressure resistance structure so that an outer shell of the reaction container 10 is not deformed even when the pressure in the storage space 9 is increased by a liquid product 12 and a vaporized material 13 being generated in the storage space 9 by the exothermic reaction described later.

The porous body 11 accommodated in the storage space 9 can be made of a porous ceramic material including a plurality of pores (not shown). By including a plurality of pores, many exothermic reaction solids 14 can be loaded on the porous body 11. Furthermore, contact area between the liquid 7 injected into the storage space 9 and the exothermic reaction solids 14 can be increased, and the chemical exothermic reaction by the liquid 7 and the exothermic reaction solids 14 can be stably generated.

Although an internal structure of the porous body 11 is not particularly limited, for example, a ceramic honeycomb structure provided with partition walls defining a plurality of cells, the plurality of cells extending from one end face to the other end face to form a flow path of fluid may be used. Thereby, many exothermic reaction solids 14 can be loaded, and entry of the liquid 7 into the interior of the porous body 11 is facilitated. As a result, the liquid 7 and the exothermic reaction solids 14 can be brought into contact with each other promptly, and the exothermic reaction can be rapidly caused from the start of the injection of the liquid 7 into the storage space 9.

As a material for forming the porous body 11, for example, a well-known material such as a Si/SiC ceramic material containing silicon and silicon carbide as main components, and a ceramic material containing cordierite as a main component can be used. Thereby, the porous body 11 can be made strong and heat resistant. Here, the "main component" refers to a main component constituting the porous body 11, and for example, it can be defined as one containing 50% by mass or more of silicon, silicon carbide and the like with respect to the whole materials, one having the highest component ratio, or the like.

The shape of the porous body 11 is not particularly limited, and may be the shape of the storage space 9 of the reaction container 10 to be accommodated. For example, when the reaction container 10 is formed in a substantially cylindrical shape and the storage space 9 inside is configured as a substantially round pillar-shaped space according to an external shape of the reaction container 10, a substantially round pillar-shaped porous body 11 capable of including the substantially round pillar-shaped storage space 9 can be obtained. A spacer (not shown) or the like may be interposed between the porous body 11 accommodated (included) in the storage space 9 and the inner wall surface (not shown) of the reaction container 10 as necessary, and the accommodation state of the porous body 11 may be stabilized.

On the other hand, the exothermic reaction solid 14 chemically causes an exothermic reaction by contact with the liquid 7. For example, when water is used as the liquid 7, calcium oxide (CaO), strontium oxide (SrO), magnesium oxide (MgO) or the like can be selected as the exothermic reaction solid 14. Alkaline earth metal element oxides other than the above or mixtures thereof, or various exothermic reaction solids 14 which cause an exothermic reaction by contact with the liquid 7 may be used. However, a combination of water and calcium oxide is particularly preferable in view of easiness of availability, safety, easiness of handling, and the like.

When water is selected as the liquid 7 and calcium oxide is selected as the exothermic reaction solid 14, calcium oxide generates heat to about several hundred C.° by contact with water to produce calcium hydroxide (see the chemical formula below).

$$CaO(s)+H_2O(l) \rightarrow Ca(OH)_2(aq) \quad \text{(Formula)}$$

At this time, water as the liquid 7 is excessively injected into the storage space 9, with respect to calcium oxide as the exothermic reaction solid 14 loaded on the porous body 11. Therefore, the water injected into the storage space 9 is evaporated (vaporized) by the heat generation accompanying the production of calcium hydroxide, and becomes water vapor. In addition, when the reaction progresses, it becomes a thermal equilibrium state and the exothermic reaction stops. Here, in the reaction, calcium hydroxide corresponds to the liquid product 12 described above, and the evaporated water vapor corresponds to the vaporized material 13.

On the other hand, the liquid injection mechanism member 4 communicates between the liquid storage tank 2 and the reaction container 10 of the heating element 3. The liquid injection mechanism member 4 mainly includes a tubular liquid flow pipe 15 capable of flowing the liquid 7 from the liquid storage tank 2 to the storage space 9, and an injection unit that feeds the liquid 7 in the liquid storage tank 2 into the storage space 9 through the liquid flow pipe 15.

In the heat generation system 1 of the present embodiment, for example, an injection valve 16 provided in the middle of the pipe line of the liquid flow pipe 15 and capable of controlling the injection timing, the injection amount and the like of the liquid 7 is used as the configuration of the injection unit. The liquid 7 can be supplied from the liquid storage tank 2 to the storage space 9 by an opening operation of the injection valve 16. At this time, the reaction container 10 of the heating element 3 is disposed at a position lower than a liquid level of the liquid 7 stored in the liquid storage tank 2 so that the liquid 7 in the liquid storage tank 2 flows into the storage space 9 according to gravity.

Furthermore, the liquid injection mechanism member 4 may be provided with a forcibly injection means (not shown) that forcibly supplies (injects) the liquid 7 from the liquid storage tank 2 to the storage space 9, using compressed air or the like simultaneously with the opening operation of the injection valve 16. As a result, the storage space 9 is filled with the liquid 7 in a short time, and the exothermic reaction solid 14 loaded on the porous body 11 can be brought into contact with the liquid 7 in a short time. Therefore, it is possible to shorten the time from the start of operation of the heat generation system 1 until the heating element 3 reaches high temperature to improve heating efficiency by the heat generation system 1.

In addition, for example, the opening and closing control of the injection valve 16 may be performed manually, or may be performed by controlling a well-known solenoid valve. By performing control using a solenoid valve, it is possible to control the injection amount of the liquid 7 and easily control an operation timing of the heat generation system 1.

On the other hand, the discharge mechanism member 5 mainly includes a tubular discharge pipe 17 that communicates with the storage space 9 of the reaction container 10, and a discharge unit that discharges the liquid product 12 and the vaporized material 13 generated by contact between the liquid 7 and the exothermic reaction solid 14, from the storage space 9 through the discharge pipe 17. Here, as a discharge unit in the heat generation system 1 of the present embodiment, a discharge valve 18 provided in the middle of the pipe line of the discharge pipe 17, and a discharge pump 19 for forcibly sucking the liquid product 12 and the vaporized material 13 from the storage space 9 and discharging them are used. Thus, for example, when water is used as the liquid 7 and calcium oxide is used as the exothermic reaction solid 14, a calcium hydroxide aqueous solution as the liquid product 12 and water vapor as the vaporized material 13 are discharged.

The contact between the liquid 7 and the exothermic reaction solid 14 causes an exothermic reaction in the storage space 9 of the reaction container 10 of the heating element 3, and the reaction container 10 becomes high temperature. Therefore, various objects (solid, fluid, and the like) can be heated by using a heat transferred to an outer surface of the reaction container 10. For example, by providing the reaction container 10 of the heat generation system 1 of the present embodiment in the middle of a flow path of fluid such as exhaust gas, the fluid passing through the vicinity of the reaction container 10 is heated, and the temperature of the fluid rises.

Thereby, heating of an object such as a fluid can be performed using the heat generation system 1 of the present embodiment. Since the heat generation system 1 of the present embodiment has a relatively simple configuration in which the liquid 7 and the exothermic reaction solid 14 are brought into contact with each other, complicated control is not required, and the manufacturing cost can be suppressed. Furthermore, a loading amount of the exothermic reaction solid 14 (such as calcium oxide) loaded on the porous body 11 accommodated in the storage space 9, an injection amount of the liquid 7 (such as water) injected, and a timing of injection start are controlled, thereby the amount of heat transferred to the outer surface of the reaction container 10 can be adjusted. As a result, the control of the heating amount of the object can be performed relatively easily.

Figure 2:
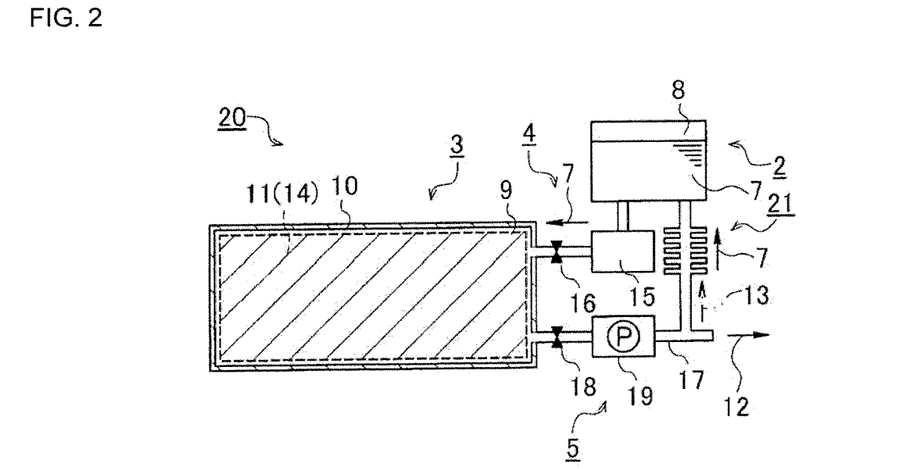
FIG. 2 is a schematic diagram showing a schematic configuration of a heat generation system of another example configuration including a liquefying unit and a liquid recovery unit.

In addition, as a heat generation system 20 of another example configuration of the present embodiment, a configuration as shown in FIG. 2 can be used. Here, in order to simplify the description, the same reference numerals are given to the configurations substantially the same as those of the heat generation system 1 (see FIG. 1) described above, and the detailed description is omitted. The heat generation system 20 of another example configuration further includes a liquefying unit 21 that cools the vaporized material 13 (for example, water vapor) discharged to the outside of the reaction container 10 through the discharge pipe 17 of the discharge mechanism member 5 and liquefies it into the liquid 7 by phase transition and a liquid recovery unit (not shown) that recovers the liquid 7 liquefied by the liquefying unit 21 into the liquid storage tank 2. Here, the liquefying unit 21 can adopt, for example, a method of air-cooling the high temperature vaporized material 13 (water vapor) by having a plurality of metal heat dissipation plates (not shown) to increase the contact area with the outside air.

The vaporized material 13 discharged from the storage space 9 gradually loses its temperature in the discharge pipe 17, reaches the liquefying unit 21, and is further deprived of heat by the plurality of heat dissipation plates. As a result, a phase transition from gas to liquid takes place, eventually returns to the liquid 7. The phase-transferred liquid 7 is recovered and again introduced into the liquid storage tank. Thereby, the liquid 7 (for example, water) can be reused.

Figure 3:
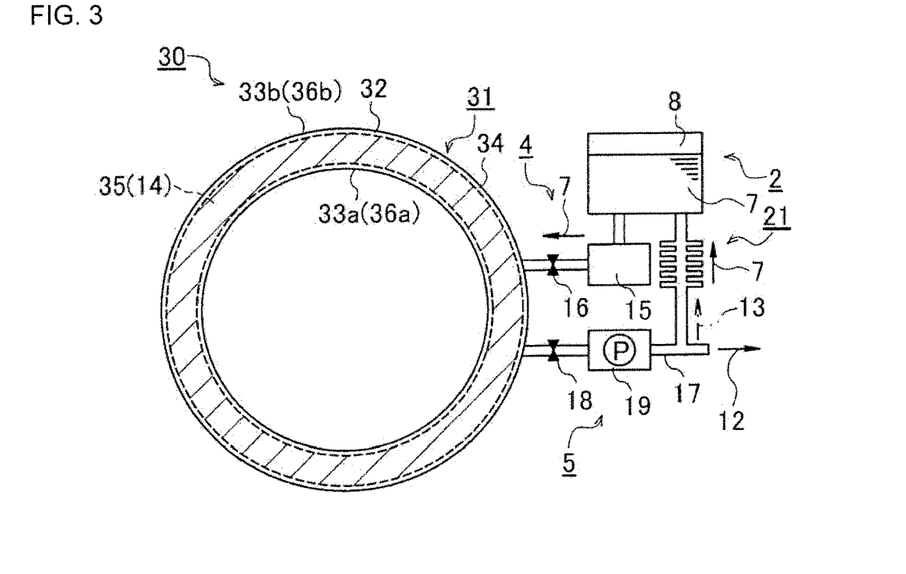
FIG. 3 is a schematic diagram showing a schematic configuration of a heat generation system of another example configuration including a reaction container having a double tube structure.

Furthermore, according to a heat generation system 30 of another example configuration of the present embodiment, a reaction container 32 of a heating element 31 can be composed of a double tube structure having an inner cylindrical portion 33a and an outer cylindrical portion 33b provided separately on the outer side of the inner cylindrical portion 33a (see FIG. 3). Thus, the reaction container 32 has a substantially annular cross section. In addition, in FIG. 3, although one having a substantially annular cross section is shown, it is not limited thereto, and one having a substantially rectangular annular cross section may be used.

In FIG. 3, the configurations other than the reaction container 32 are the same as those in FIG. 2 described above, and the same reference numerals are given to the same configurations. In this case, according to the shape of the reaction container 32 having a double tube structure, the storage space 34 inside also has a substantially annular cross section, and the porous body 35 to be accommodated also has substantially cylindrical shape.

By the heat generation system 30 having the reaction container 32 adopting the double tube structure, the temperature of regions close to an inner peripheral surface 36a and an outer peripheral surface 36b of the reaction container 32 can be raised. Therefore, it becomes useful for heating of liquid, gas and the like which pass through these regions.

Figure 4:
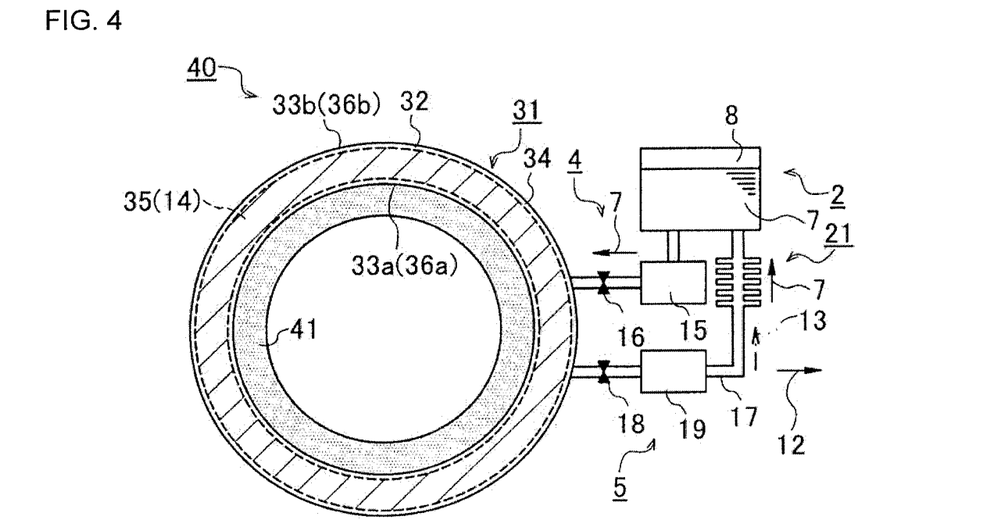
FIG. 4 is a schematic diagram showing a schematic configuration of a heat generation system of another example configuration including a heat exchange unit.

On the other hand, according to a heat generation system 40 of another example configuration of the present invention, in addition to the heat generation system 30 shown in FIG. 3, a heat exchange unit 41 having a substantially annular cross section is provided so as to abut against the inner peripheral surface 36a of the inner cylindrical portion 33a of the reaction container 32 having a double tube structure. Thereby, heat of the reaction container 32 which has become high temperature by operation of the heat generation system 40 can be transferred through the heat exchange unit 41. As a result, the heat generated in the reaction container 32 can be efficiently transferred to another medium such as a fluid, and heat loss can be suppressed. In addition, a mounting position of the heat exchange unit 41 is not limited to the inner peripheral surface 36a side of the reaction container 32, and the heat exchange unit 41 may be provided in the outer peripheral surface 36b side.

Here, as the heat exchange unit 41, for example, a honeycomb heat exchange unit using a honeycomb-shaped honeycomb structure defining a plurality of cells, the plurality of cells extending from one end face to the other end face to form a flow path of fluid can be formed. As described above, the honeycomb heat exchange unit can be constructed using various ceramic materials, and is a material excellent in heat exchange and heat transfer. Thereby, efficiency of heat exchange is improved.

Figure 5:
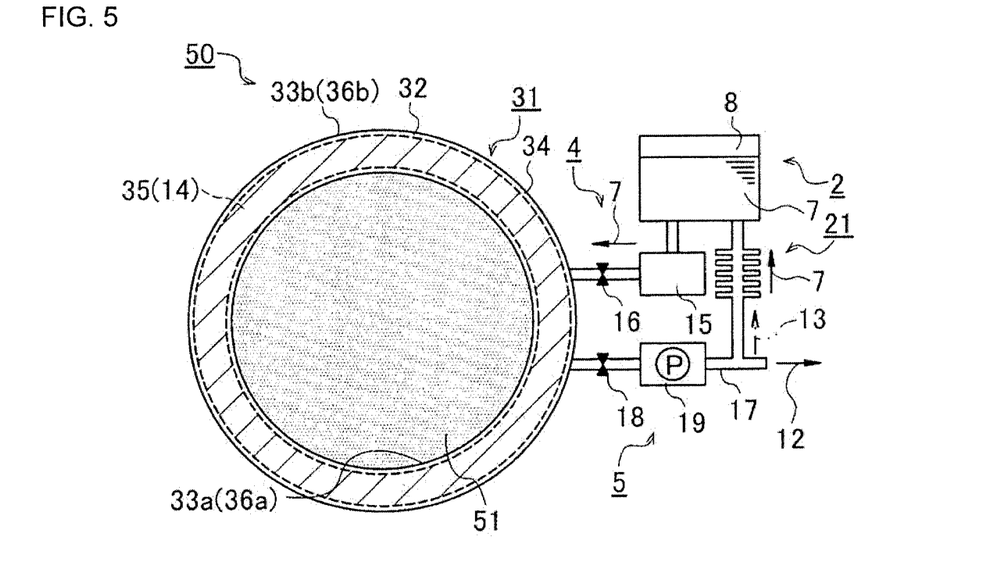
FIG. 5 is a schematic diagram showing a schematic configuration of a heat generation system including a heat exchange unit of another example configuration.

Furthermore, according to a heat generation system 50 of another example configuration of the present invention, in addition to the heat generation system 30 shown in FIG. 3, it is possible to use as a heat exchange unit 51 which consists of a substantially round pillar-shaped honeycomb structure (see FIG. 5) so as to completely fill the inner peripheral surface 36a side of the inner cylindrical portion 33a of the reaction container 32 having a double tube structure. Here, the heat exchange unit 51 can be formed as a honeycomb heat exchange unit as described above. Thereby, the fluid can be heated without disturbing a flow of the fluid.

Figure 6:
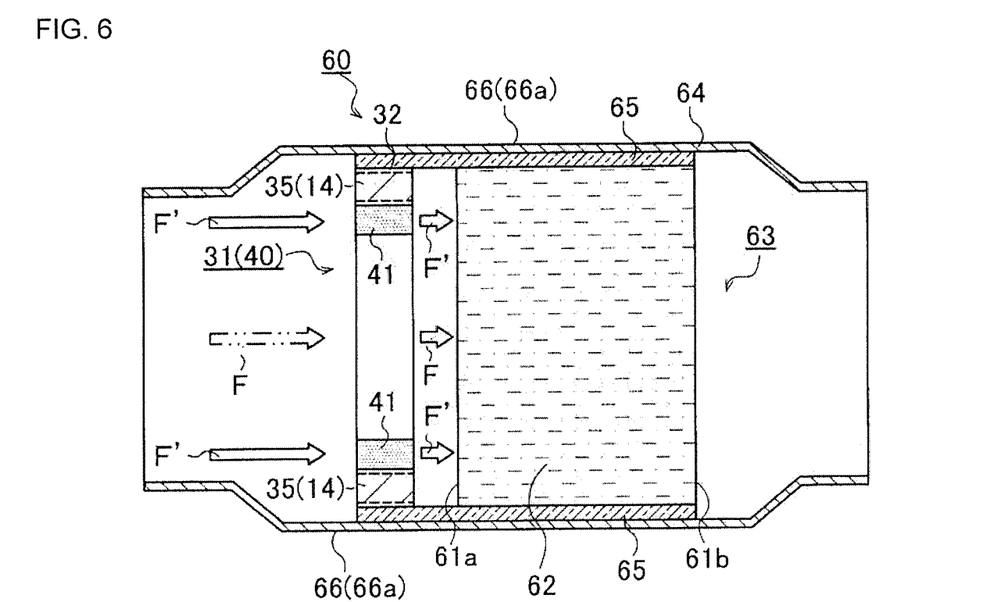
FIG. 6 is a cross-sectional schematic diagram showing a schematic configuration of an exhaust gas purification device of the present embodiment.

(2) Exhaust Gas Purification Device and Method for Regenerating Honeycomb Structure As shown in FIG. 6, an exhaust gas purification device 60 of an embodiment of the present invention includes a honeycomb structure 62 as a DPF having partition walls (not shown) defining a plurality of cells (not shown), the plurality of cells extending from one end face 61a to the other end face 61b to form a flow path of fluid F, a metal can body 64 having a structure accommodation space 63 capable of accommodating the honeycomb structure 62 therein, and a heat generation system 40 (see FIG. 4) in which the heating element 31 is disposed at an upstream position of the structure accommodation space 63, facing the one end face 61a of the honeycomb structure 62, and has a regeneration function of removing particulate matter.

Further, a spacer member 65 is interposed between the can body 64, and the honeycomb structure 62 and the heating element 31. FIG. 6 is a cross-sectional schematic diagram schematically showing a schematic configuration of the exhaust gas purification device 60 of the present embodiment, and illustration of the configuration in the heat generation system 40 other than the heating element 31 is omitted. Moreover, unless specified otherwise, the following description will be made on the assumption that water is used as the liquid 7 and calcium oxide is used as the exothermic reaction solid 14.

Furthermore, the honeycomb structure may be, as the DPF described above, a plugged honeycomb structure including a plurality of plugging portions in which open ends of the cells in the one end face 61a and the other end face 61b are plugged in accordance with each predetermined arrangement standard. Since configurations of the honeycomb structure 62 and the plugged honeycomb structure are already known, detailed description thereof is omitted herein.

As the heat generation system 40, the one shown in FIG. 4 described above is used, and the heating element 31 thereof has a double tube structure having the inner cylindrical portion 33a and the outer cylindrical portion 33b, in which the annular porous body 35 loaded with the exothermic reaction solid 14 on the storage space 34 inside is accommodated. Further, a substantially annular heat exchange unit 41 (honeycomb heat exchange unit) is provided so as to abut along a shape of the inner peripheral surface 36a of the inner cylindrical portion 33a.

By using the exhaust gas purification device 60 having the above configuration, particulate matter such as soot deposited on the honeycomb structure 62 can be efficiently removed, whereby regeneration treatment of the honeycomb structure 62 is performed. That is, in the regeneration treatment for removing the particulate matter, the liquid 7 is injected from the liquid storage tank 2 of the heat generation system 40 into the storage space 9 of the reaction container 10, in accordance with a timing of post injection for injecting unburned diesel fuel (corresponding to the fluid F), to cause an exothermic reaction.

The heat generation system 40 is operated simultaneously with the start of the fluid introducing step of introducing the fluid F into the honeycomb structure 62 or before the start of introduction of the fluid F, and injection of the liquid 7 (water) from the liquid storage tank 2 to the reaction container 32 of the heating element 31 is started. As a result, an exothermic reaction occurs due to contact between the liquid 7 and the exothermic reaction solid 14 (calcium oxide), and the heating element 31 becomes high temperature in a short time. Here, the "high temperature" indicates a temperature range of about 200° C. to 500° C., according to the combination of water and calcium oxide. The temperature range changes according to the liquid 7 and the exothermic reaction solid 14 to be used.

Furthermore, reaction heat due to the exothermic reaction is transferred to the heat exchange unit 41 provided along the inner peripheral surface 36a of the heating element 31 having a double tube structure. Since this heat exchange unit 41 is a honeycomb-shaped honeycomb heat exchange unit as mentioned above, a part of fluid F (see fluid F' in FIG. 6) composed of unburned diesel fuel passes through the heat exchange unit 41 and reaches one end face 61a of the honeycomb structure 62. As a result, the fluid F' is heated by passing through the heat exchange unit 41 (fluid heating step).

Figure 7:
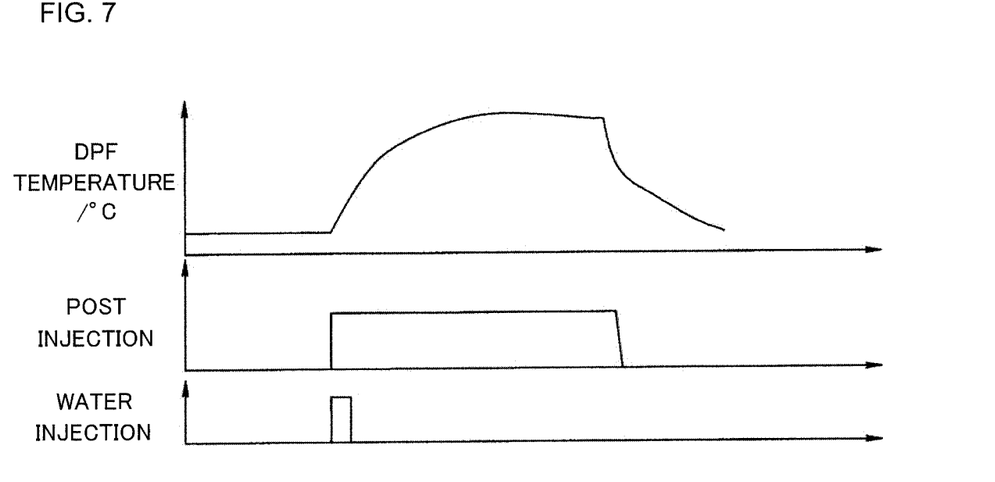
FIG. 7 is a chart showing temperature of DPF, and timings of post injection and water injection in the exhaust gas purification device of FIG. 6 along a time series.

Thereby, the temperature (DPF temperature) of the honeycomb structure 62 in which the regeneration treatment is performed can be controlled to be high from the beginning of the start of the regeneration treatment (see FIG. 7). As a result, the high temperature fluid F heated by the heating element 31 and the heat exchange unit 41 is introduced into the structure of the honeycomb structure 62, and the deposited particulate matter is efficiently removed, whereby the honeycomb structure 62 is regenerated (regeneration treatment step).

In particular, since the high temperature fluid F is introduced into the structure from the beginning of the start of the regeneration treatment, the efficiency of the regeneration treatment is stabilized, and the regeneration treatment can be completed in a short time. Therefore, the cost and the like of the regeneration treatment can be reduced. Even when the heat exchange unit 41 as described above is not a honeycomb heat exchange unit, the fluid F is heated by passing through the vicinity of the heat exchange unit 41 or the heating element 31, and sufficient effect in the exhaust gas purification device 60 of the present embodiment can be exhibited.

Figure 8:
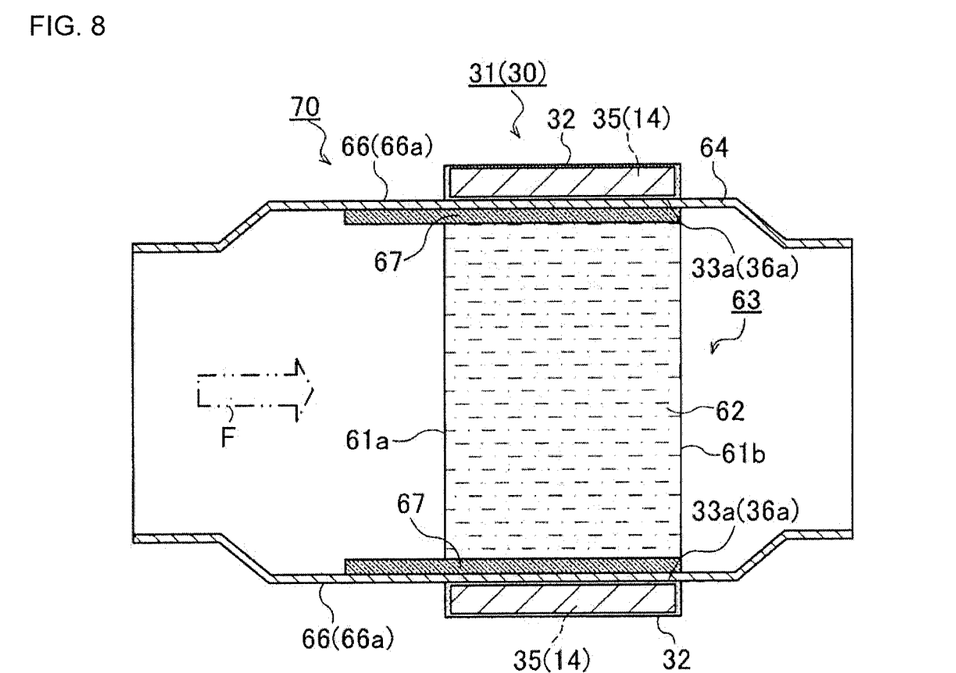
FIG. 8 is a cross-sectional schematic diagram showing a schematic configuration of an exhaust gas purification device of another example configuration.

Furthermore, as shown in FIG. 8, an exhaust gas purification device 70 of another example configuration of the present invention mainly includes a honeycomb structure 62 as a DPF having partition walls (not shown) defining a plurality of cells (not shown), the plurality of cells extending from one end face 61a to the other end face 61b to form a flow path of fluid F, a metal can body 64 having a structure accommodation space 63 capable of accommodating the honeycomb structure 62 therein, and a heat generation system 30 (see FIG. 3) in which the heating element 31 is disposed so that the heating element 31 abuts against or is embedded in the inner peripheral surface 36a of the heating element 31 in the outer surface of an outer shell portion 66a of the can body outer shell portion 66 of the can body 64.

Further, a spacer member 67 is interposed between the can body 64, the honeycomb structure 62 and the can body outer shell portion 66. The spacer member 67 is formed of a thermal conductive material that transfers reaction heat generated by the heating element 31 to the honeycomb structure 62 through the metal can body 64 (can body outer shell portion 66) such as stainless steel and the spacer member 67. The spacer member 67 corresponds to the heat conduction unit in the present invention.

As a result, the reaction heat generated by the heating element 31 is rapidly transferred to the honeycomb structure 62. In the exhaust gas purification device 70 of the present embodiment, one in which the heating element 31 is disposed so as to abut against the outer surface of an outer shell portion 66a of the can body outer shell portion 66 is shown. However, it is not limited thereto, and one in which the heating element 31 is embedded in the can body outer shell portion 66 may be used, for example. Even with this configuration, the reaction heat can be effectively transferred to the honeycomb structure 62.

By using the exhaust gas purification device 70 having the above configuration, particulate matter such as soot deposited on the honeycomb structure 62 can be efficiently removed, whereby regeneration treatment of the honeycomb structure 62 is performed. The difference from the exhaust gas purification device 60 described above is not to heat the fluid F, but to directly heat the honeycomb structure 62 to be regenerated.

Thereby, the heat generation system 30 is operated simultaneously with the start of the fluid introducing step of introducing the fluid F into the honeycomb structure 62 or before the start of introduction of the fluid F, and injection of the liquid 7 (water) from the liquid storage tank 2 to the reaction container 32 of the heating element 31 is started. As a result, an exothermic reaction occurs due to contact between the liquid 7 and the exothermic reaction solid 14 (calcium oxide), and the heating element 31 becomes high temperature in a short time.

Figure 9:
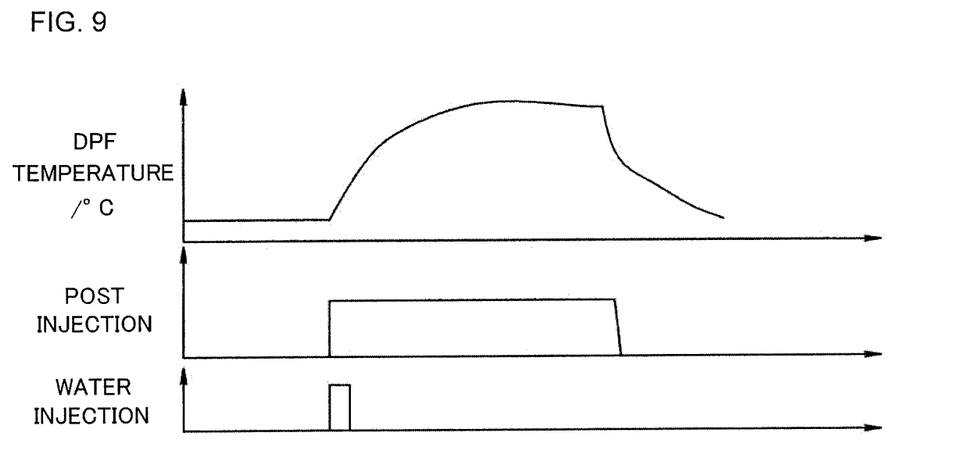
FIG. 9 is a chart showing temperature of DPF, and timings of post injection and water injection in the exhaust gas purification device of FIG. 8 along a time series.

At this time, the reaction heat generated by the heating element 31 is transferred to the honeycomb structure 62 through the metal can body outer shell portion 66 and the thermally conductive spacer member 67 (honeycomb structure heating step). As a result, the temperature of the honeycomb structure 62 in the can body 64 rises earlier (see FIG. 9) as compared to an ordinary regeneration treatment. As a result, the same effect as direct heating of the fluid F can be exhibited.

Figure 10:
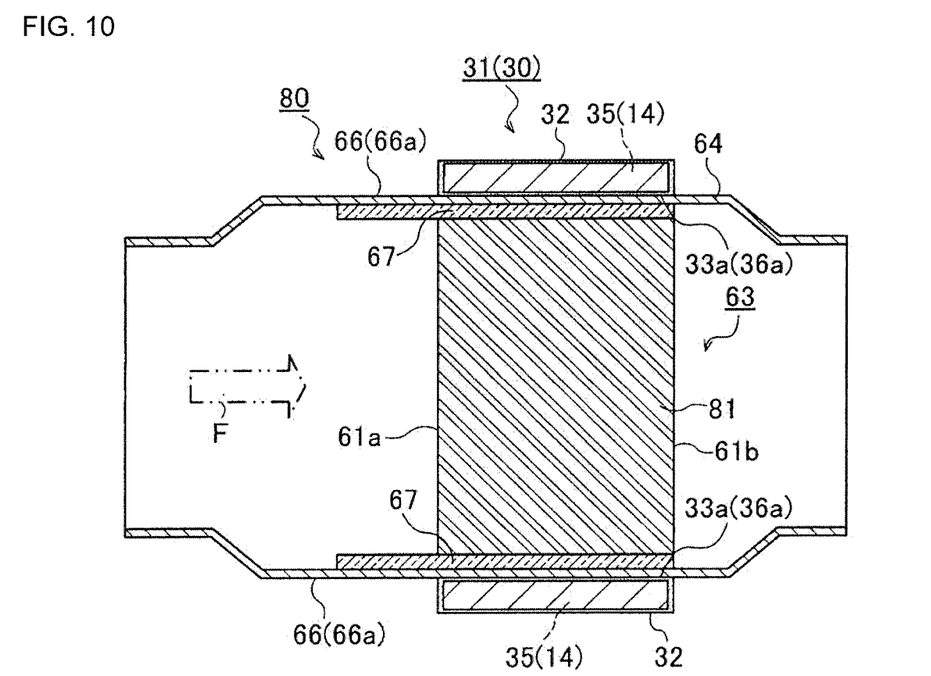
FIG. 10 is a cross-sectional schematic diagram showing a schematic configuration of an exhaust gas purification device of another example configuration.

Furthermore, an exhaust gas purification device 80 of another example configuration of the present invention can be one as shown in FIG. 10. According to this, the configuration is substantially the same as that of the exhaust gas purification device 70 already described, and it is different in that the catalyst loading honeycomb structure 81 is accommodated in the structure accommodation space 63 of the can body 64. Here, the catalyst loading honeycomb structure 81 refers to, for example, one in which at least one of a selective reduction catalyst (SCR catalyst), a three-way catalyst, a $NO_x$ storage type three-way catalyst and the like is loaded on the surface of the partition wall and/or inside the partition wall of the honeycomb structure.

Figure 11:
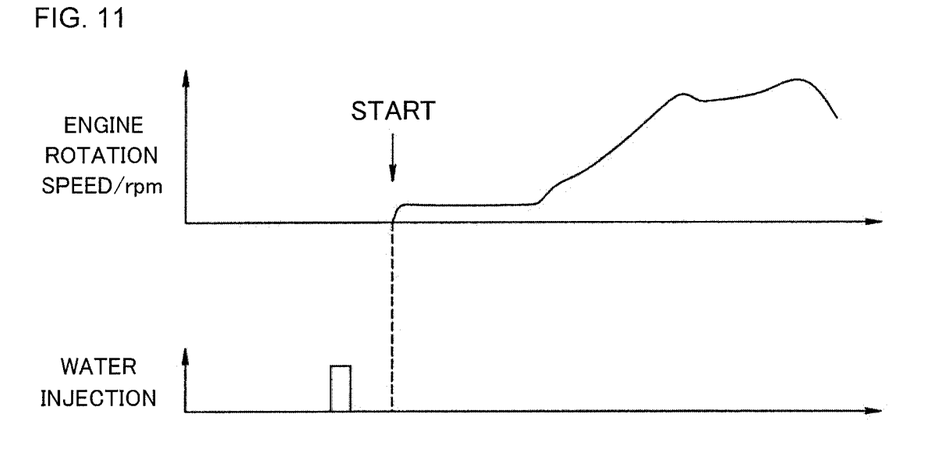
FIG. 11 is a chart showing engine rotation speed and a timing of water injection in the exhaust gas purification device of FIG. 10 along a time series.

Thereby, also in the exhaust gas purification device 80 adopting the catalyst loading honeycomb structure 81, the same effect of the regeneration treatment as described above can be exhibited. For example, as shown in FIG. 11, by generating reaction heat by the heat generation system 30 before starting the start of the diesel engine, good regeneration treatment can be performed.

Hereinafter, examples of the heat generation system, the exhaust gas purification device, and the method for regenerating a honeycomb structure of the present invention will be described, but the heat generation system and the like of the present invention are not limited to these examples.

EXAMPLES

1. Example 1 and Comparative Example 1

(1) Exhaust Gas Purification Device (See FIG. 8)

A Si/SiC-based honeycomb structure (DPF) with a honeycomb diameter of 144 mm and a honeycomb length of 152 mm was canned into a metal can body via a thermally conductive spacer member. Furthermore, a heating element having a reaction container having a double tube structure was installed around the can body. Here, the interval (gap interval) between the inner cylindrical portion and outer cylindrical portion of the reaction container was set to 8.5 mm. A Si/SiC-based porous body loaded with calcium oxide (CaO) as an exothermic solid (hereinafter, referred to as "CaO-loaded Si/SiC-based porous body") was stored in a storage space in a reaction container. Here, the volume ratio of the porous body and the exothermic reaction solid was set to 1:1, and the overall porosity was set to 20%.

(2) Manufacturing Method of CaO-Loaded Si/SiC-Based Porous Body

A doughnut-shaped Si/SiC-based porous body with a thickness of 8.5 mm, a length of 63 mm and a porosity of 65% was impregnated with a slurry-like calcium carbonate aqueous solution obtained by adding water to a calcium carbonate ($CaCO_3$) powder, and then heat treatment was performed at a heating temperature of 1300° C. for 1 hour. Thereby, calcium carbonate was changed to calcium oxide to obtain a CaO-loaded Si/SiC-based porous body. Two obtained CaO-loaded Si/SiC-based porous bodies were arranged in series and stored in a reaction container having a double tube structure.

(3) Experimental Method

The exhaust gas purification device having the above configuration (see FIG. 8) was mounted on a 2000 cc diesel engine exhaust system and continuously operated under the conditions of rotation speed: 2000 rpm and drive torque: 8 Nm to deposit soot in the honeycomb structure (DPF).

In parallel with the deposition of soot, an injection valve of an injection unit of a heat generation system was closed, whereas a discharge valve of a discharge unit was opened, and a discharge pump was operated for 5 minutes to discharge remaining gas in the storage space of the reaction container. Thereafter, the discharge valve was closed to seal the storage space of the reaction container. Thereafter, the weight of the honeycomb structure was measured, then regeneration treatment of the honeycomb structure was conducted.

At this time, the injection valve of the injection unit was opened 30 s before the start of the regeneration treatment of the honeycomb structure, and liquid (water) was injected into the storage space of the reaction container. After the lapse of 30 s from the start of water injection, regeneration treatment of the honeycomb structure was started, the temperature at one end face of the honeycomb structure (inlet gas temperature) was adjusted to 600° C., and regeneration for 8 minutes was performed. Thereafter, the weight of the honeycomb structure was measured again, and regeneration efficiency of soot was measured. A case where the heat generation system was operated under the above conditions is referred to as Example 1, and a case where the heat generation system was not operated is referred to as Comparative Example 1.

(4) Experimental Results

Comparing Example 1 and Comparative Example 1, the regeneration efficiency of Comparative Example 1 was 40%, whereas the regeneration efficiency was 70% in Example 1 in which the heat generation system was operated, thus it was confirmed that the regeneration efficiency was significantly increased by a use of the heat generation system. A summary of (1) exhaust gas purification device, (2) CaO-loaded Si/SiC-based porous body, (3) conditions of experimental method, and (4) experimental results is shown in Table 1 below.

TABLE 1

| | | Unit | Example 1 | Comparative Example 1 | Example 2 | Comparative Example 2 | Example 3 |
|---|---|---|---|---|---|---|---|
| Exhaust gas purification device | | — | FIG. 8 | FIG. 8 | FIG. 6 | FIG. 6 | FIG. 10 |
| Operation of heat generation system | | — | Yes | No | Yes | No | Yes |
| Honeycomb structure | Honeycomb material | — | Si/SiC | Si/SiC | Si/SiC | Si/SiC | Cordierite |
| | Honeycomb diameter | /mm | 144 | 144 | 144 | 144 | 110 |
| | Honeycomb length | /mm | 152 | 152 | 152 | 152 | 100 |
| | Gap interval | /mm | 8.5 | 8.5 | — | — | 8.5 |
| | Loaded catalyst | — | — | — | — | — | Three-way catalyst |
| Heating element | Position of heating element | — | Around honeycomb structure | Around honeycomb structure | Upstream position of honeycomb structure | Upstream position of honeycomb structure | Around honeycomb structure |
| | Structure of reaction container | | | | Double tube | | |
| | Gap interval | /mm | 8.5 | 8.5 | | | |
| | Coverage | /% | — | — | — | — | 50 |
| | Porous body Material | — | Si/SiC | Si/SiC | Si/SiC | Si/SiC | Si/SiC |
| | Thickness | /mm | 8.5 | 8.5 | 8.5 | 8.5 | 8.5 |
| | Length | /mm | 63 | 63 | 30 | 30 | 90 |
| | Porosity | /% | 65 | 65 | 65 | 65 | 65 |
| | Exothermic reaction solid | — | CaO | CaO | CaO | CaO | CaO |
| | Volume ratio of porous body:exothermic reaction solid | | 1:1 | 1:1 | 1:1 | 1:1 | 1:1 |
| Engine exhaust system | Engine type | | Diesel | Diesel | Diesel | Diesel | Gasoline |
| | Rotation speed | /rpm | 2000 | 2000 | 2000 | 2000 | 2000 |
| | Drive torque | /Nm | 8 | 8 | 8 | 8 | 5 |
| | Operation time | /min | 5 | 5 | 5 | 5 | 5 |
| Liquid | Injected liquid | — | Water | Water | Water | Water | Water |
| | Injection timing | — | 30 s Before regeneration treatment | | | | 15 s Before engine start |
| Regeneration treatment | Regeneration time | /min | 8 | 8 | 8 | 8 | — |
| | Gas temperature | /° C. | 600 | 600 | 600 | 600 | — |
| | Regeneration efficiency | /% | 70 | 40 | 60 | 40 | — |

TABLE 1-continued

| | Unit | | | | | |
|---|---|---|---|---|---|---|
| Time to reach 180° C. | /s | — | — | — | — | 15 |

| | | Unit | Comparative Example 3 | Example 4 | Comparative Example 4 | Example 5 | Comparative Example 5 |
|---|---|---|---|---|---|---|---|
| Exhaust gas purification device | | — | FIG. 10 | FIG. 10 | FIG. 10 | FIG. 10 | FIG. 10 |
| Operation of heat generation system | | — | No | Yes | No | Yes | No |
| Honeycomb structure | Honeycomb material | — | Cordierite | Cordierite | Cordierite | Cordierite | Cordierite |
| | Honeycomb diameter | /mm | 110 | 110 | 110 | 110 | 110 |
| | Honeycomb length | /mm | 100 | 100 | 100 | 100 | 100 |
| | Gap interval | /mm | 8.5 | 8.5 | 8.5 | 8.5 | 8.5 |
| | Loaded catalyst | — | Three-way catalyst | Three-way catalyst | Three-way catalyst | Three-way catalyst | Three-way catalyst |
| Heating element | Position of heating element | — | colspan Around honeycomb structure | | | | |
| | Structure of reaction container | | colspan Double tube | | | | |
| | Gap interval | /mm | | | | | |
| | Coverage | /% | 50 | 50 | 50 | 50 | 50 |
| | Porous body Material | — | Si/SiC | Si/SiC | Si/SiC | Si/SiC | Si/SiC |
| | Thickness | /mm | 8.5 | 8.5 | 8.5 | 8.5 | 8.5 |
| | Length | /mm | 90 | 63 | 63 | 63 | 63 |
| | Porosity | /% | 65 | 65 | 65 | 65 | 65 |
| | Exothermic reaction solid | — | CaO | SrO | SrO | MgO | MgO |
| | Volume ratio of porous body:exothermic reaction solid | | 1:1 | 1:1 | 1:1 | 1:1 | 1:1 |
| Engine exhaust system | Engine type | | Gasoline | Gasoline | Gasoline | Gasoline | Gasoline |
| | Rotation speed | /rpm | 2000 | 2000 | 2000 | 2000 | 2000 |
| | Drive torque | /Nm | 5 | 5 | 5 | 5 | 5 |
| | Operation time | /min | 5 | 5 | 5 | 5 | 5 |
| Liquid | Injected liquid | — | Water | Water | Water | Water | Water |
| | Injection timing | — | colspan 15 s Before engine start | | | | |
| Regeneration treatment | Regeneration time | /min | — | — | — | — | — |
| | Gas temperature | /° C. | — | — | — | — | — |
| | Regeneration efficiency | /% | — | — | — | — | — |
| | Time to reach 180° C. | /s | 20 | 13 | 20 | 16 | 20 |

2. Example 2 and Comparative Example 2

(1) Exhaust Gas Purification Device (See FIG. 6)

A Si/SiC-based honeycomb structure (DPF) with a honeycomb diameter of 144 mm and a honeycomb length of 152 mm was canned into a metal can body via a thermally conductive spacer member (in the same as in Example 1 and Comparative Example 1). Furthermore, a heating element having a reaction container having a double tube structure was installed on the upstream side of the honeycomb structure. A Si/SiC-based porous body (hereinafter, referred to as "CaO-loaded Si/SiC-based porous body") loaded with calcium oxide (CaO) as an exothermic solid was stored in a storage space in a reaction container. Here, the volume ratio of the porous body and the exothermic reaction solid was set to 1:1, and the overall porosity was set to 20%. Furthermore, a honeycomb structure made of SiC was mounted as a heat exchange unit along an inner peripheral surface of the reaction container (see FIG. 6).

(2) Manufacturing Method of CaO-Loaded Si/SiC-Based Porous Body

Description is omitted because it is the same as in Example 1 and Comparative Example 1.

(3) Experimental Method

Description is omitted because it is the same as in Example 1 and Comparative Example 1. As in Example 1 and Comparative Example 1, an injection valve of an injection unit is opened 30 s before the start of the regeneration treatment of the honeycomb structure, and liquid (water) is injected into the storage space of the reaction container. A case where the heat generation system was operated under the above conditions is referred to as Example 2, and a case where the heat generation system was not operated is referred to as Comparative Example 2.

(4) Experimental Results

Comparing Example 2 and Comparative Example 2, the regeneration efficiency of Comparative Example 1 was 40%, whereas the regeneration efficiency was 60% in Example 1 in which the heat generation system was operated, thus it was confirmed that the regeneration efficiency was significantly increased by a use of the heat generation system. A summary of (1) exhaust gas purification device, (2) CaO-loaded Si/SiC-based porous body, (3) conditions of experimental method, and (4) experimental results is shown in Table 1 above.

3. Example 3 and Comparative Example 3

(1) Exhaust Gas Purification Device (See FIG. 10)

A catalyst loading honeycomb structure in which a cordierite-made (made of Cd) honeycomb structure with a honeycomb diameter of 110 mm and a honeycomb length of 100 mm is loaded with a three-way catalyst, was canned into a metal can body via a thermally conductive spacer member. At this time, a structure was formed such that 50% of the entire length of the spacer member was made of metal mesh to improve the thermal conductivity between the catalyst loading honeycomb structure and the can body (coverage: 50%). Furthermore, a heating element having a reaction container having a double tube structure was installed around the can body. A Si/SiC-based porous body loaded with calcium oxide (CaO) as an exothermic solid (hereinafter, referred to as "CaO-loaded Si/SiC-based porous body") was stored in a storage space in a reaction container. Here, the volume ratio of the porous body and the exothermic reaction solid was set to 1:1, and the overall porosity was set to 20%.

(2) Manufacturing Method of CaO-Loaded Si/SiC-Based Porous Body

A doughnut-shaped Si/SiC-based porous body with a thickness of 8.5 mm, a length of 90 mm and a porosity of 65% was impregnated with a slurry-like calcium carbonate aqueous solution obtained by adding water to a calcium carbonate ($CaCO_3$) powder, and then heat treatment was performed at a heating temperature of 1300° C. for 1 hour. Thereby, calcium carbonate was changed to calcium oxide to obtain a CaO-loaded Si/SiC-based porous body.

(3) Experimental Method

The exhaust gas purification device having the above configuration (see FIG. 10) was mounted on a 2000 cc gasoline engine exhaust system, and warm-up operation was performed under the conditions of rotation speed: 2000 rpm and drive torque: 5 Nm.

In parallel with the warm-up operation, an injection valve of an injection unit of a heat generation system was closed, whereas a discharge valve of a discharge unit was opened, and a discharge pump was operated for 5 minutes to discharge remaining gas in the storage space of the reaction container. Thereafter, the discharge valve was closed to seal the storage space of the reaction container. Thereafter, the engine was stopped and allowed to cool to room temperature. Next, start-up operation of the engine was performed, and the temperature of a central position of the catalyst loading honeycomb structure was measured by a thermocouple.

At this time, the injection valve of the injection unit was opened 15 s before engine start, and liquid (water) was injected into the storage space of the reaction container. The time after the engine was started until the temperature of the central position of the catalyst loading honeycomb structure reached 180° C. was measured. A case where the heat generation system was operated under the above conditions is referred to as Example 3, and a case where the heat generation system was not operated is referred to as Comparative Example 3.

(4) Experimental Results

Comparing Example 3 and Comparative Example 3, the time to reach 180° C. of Comparative. Example 3 was 20 s, whereas the time to reach 180° C. of Example 3 in which the heat generation system was operated was 15 s, thus it was confirmed that the time to reach 180° C. was shortened by the operation of the heat generation system. That is, by warming the catalyst loading honeycomb structure before engine start, the temperature at which the loaded catalyst is activated can be rapidly reached. As a result, it is possible to perform purification treatment maintaining high catalyst activity immediately after engine start. A summary of (1) exhaust gas purification device, (2) CaO-loaded Si/SiC-based porous body, (3) conditions of experimental method, and (4) experimental results is shown in Table 1 above.

4. Example 4 and Comparative Example 4

(1) Exhaust Gas Purification Device (See FIG. 10)

A catalyst loading honeycomb structure in which a cordierite-made (made of Cd) honeycomb structure with a honeycomb diameter of 110 mm and a honeycomb length of 100 mm is loaded with a three-way catalyst, was canned into a metal can body via a thermally conductive spacer member. At this time, a structure was formed such that 50% of the entire length of the spacer member was made of metal mesh to improve the thermal conductivity between the catalyst loading honeycomb structure and the can body (coverage: 50%). Furthermore, a heating element having a reaction container having a double tube structure was installed around the can body. A Si/SiC-based porous body loaded with strontium oxide (SrO) as an exothermic solid (hereinafter, referred to as "SrO-loaded Si/SiC-based porous body") was stored in a storage space in a reaction container. Here, the volume ratio of the porous body and the exothermic reaction solid was set to 1:1, and the overall porosity was set to 20%.

(2) Manufacturing Method of SrO-Loaded Si/SiC-Based Porous Body

A doughnut-shaped Si/SiC-based porous body with a thickness of 8.5 mm, a length of 90 mm and a porosity of 65% was impregnated with a slurry-like strontium carbonate aqueous solution obtained by adding water to a strontium carbonate ($SrCO_3$) powder, and then heat treatment was performed at a heating temperature of 1300° C. for 1 hour. Thereby, strontium carbonate was changed to strontium oxide to obtain a SrO-loaded Si/SiC-based porous body.

(3) Experimental Method

The exhaust gas purification device having the above configuration (see FIG. 10) was mounted on a 2000 cc gasoline engine exhaust system, and warm-up operation was performed under the conditions of rotation speed: 2000 rpm and drive torque: 5 Nm.

In parallel with the warm-up operation, an injection valve of an injection unit of a heat generation system was closed, whereas a discharge valve of a discharge unit was opened, and a discharge pump was operated for 5 minutes to discharge remaining gas in the storage space of the reaction container. Thereafter, the discharge valve was closed to seal the storage space of the reaction container. Thereafter, the engine was stopped and allowed to cool to room temperature. Next, start-up operation of the engine was performed, and the temperature of a central position of the catalyst loading honeycomb structure was measured by a thermocouple.

At this time, the injection valve of the injection unit was opened 15 s before engine start, and liquid (water) was injected into the storage space of the reaction container. The time after the engine was started until the temperature of the central position of the catalyst loading honeycomb structure reached 180° C. was measured. A case where the heat generation system was operated under the above conditions is referred to as Example 4, and a case where the heat generation system was not operated is referred to as Comparative Example 4.

(4) Experimental Results

Comparing Example 4 and Comparative Example 4, the time to reach 180° C. of Comparative Example 4 was 20 s, whereas the time to reach 180° C. of Example 4 in which the heat generation system was operated was 13 s, thus it was confirmed that the time to reach 180° C. was shortened by the operation of the heat generation system. That is, it was confirmed that the same effect was exhibited even when the exothermic reaction solid was changed from calcium oxide (CaO) to strontium oxide (SrO). A summary of (1) exhaust gas purification device, (2) CaO-loaded Si/SiC-based porous body, (3) conditions of experimental method, and (4) experimental results is shown in Table 1 above.

5. Example 5 and Comparative Example 5

(1) Exhaust Gas Purification Device (See FIG. 10)

A catalyst loading honeycomb structure in which a cordierite-made (made of Cd) honeycomb structure with a honeycomb diameter of 110 mm and a honeycomb length of 100 mm is loaded with a three-way catalyst, was canned into a metal can body via a thermally conductive spacer member. At this time, a structure was formed such that 50% of the entire length of the spacer member was made of metal mesh to improve the thermal conductivity between the catalyst loading honeycomb structure and the can body (coverage: 50%). Furthermore, a heating element having a reaction container having a double tube structure was installed around the can body. A Si/SiC-based porous body loaded with magnesium oxide (MgO) as an exothermic solid (hereinafter, referred to as "MgO-loaded Si/SiC-based porous body") was stored in a storage space in a reaction container. Here, the volume ratio of the porous body and the exothermic reaction solid was set to 1:1, and the overall porosity was set to 20%.

(2) Manufacturing Method of MgO-Loaded Si/SiC-Based Porous Body

A doughnut-shaped Si/SiC-based porous body with a thickness of 8.5 mm, a length of 90 mm and a porosity of 65% was impregnated with a slurry-like magnesium carbonate aqueous solution obtained by adding water to a magnesium carbonate ($MgCO_3$) powder, and then heat treatment was performed at a heating temperature of 1300° C. for 1 hour. Thereby, magnesium carbonate was changed to magnesium oxide to obtain a MgO-loaded Si/SiC-based porous body.

(3) Experimental Method

The exhaust gas purification device having the above configuration (see FIG. 8) was mounted on a 2000 cc gasoline engine exhaust system, and warm-up operation was performed under the conditions of rotation speed: 2000 rpm and drive torque: 5 Nm.

In parallel with the warm-up operation, an injection valve of an injection unit of a heat generation system was closed, whereas a discharge valve of a discharge unit was opened, and a discharge pump was operated for 5 minutes to discharge remaining gas in the storage space of the reaction container. Thereafter, the discharge valve was closed to seal the storage space of the reaction container. Thereafter, the engine was stopped and allowed to cool to room temperature. Next, start-up operation of the engine was performed, and the temperature of a central position of the catalyst loading honeycomb structure was measured by a thermocouple.

At this time, the injection valve of the injection unit was opened 15 s before engine start, and liquid (water) was injected into the storage space of the reaction container. The time after the engine was started until the temperature of the central position of the catalyst loading honeycomb structure reached 180° C. was measured. A case where the heat generation system was operated under the above conditions is referred to as Example 5, and a case where the heat generation system was not operated is referred to as Comparative Example 5.

(4) Experimental Results

Comparing Example 5 and Comparative Example 5, the time to reach 180° C. of Comparative Example 5 was 20 s, whereas the time to reach 180° C. of Example 5 in which the heat generation system was operated was 16 s, thus it was confirmed that the time to reach 180° C. was shortened by the operation of the heat generation system. That is, it was confirmed that the same effect was exhibited even when the exothermic reaction solid was changed from calcium oxide (CaO) of Example 3 or strontium oxide (SrO) of Example 4 to magnesium oxide (MgO). A summary of (1) exhaust gas purification device, (2) CaO-loaded Si/SiC-based porous body, (3) conditions of experimental method, and (4) experimental results is shown in Table 1 above.

As described above, according to the heat generation system, the exhaust gas purification device, and the method for regenerating a honeycomb structure of the present invention, an exothermic reaction is generated by contact between a liquid such as water and an exothermic reaction solid such as calcium oxide, and the reaction heat thus obtained can be used to heat a fluid such as diesel fuel or the honeycomb structure itself. Thereby, it is possible to shorten the time until the honeycomb structure that performs regeneration treatment and the like and the catalyst loading honeycomb structure that performs purification treatment and the like warm up, and it is possible to exhibit a stable effect immediately after the start of regeneration treatment and purification treatment. As a result, the regeneration efficiency and the purification efficiency can be improved.

INDUSTRIAL APPLICABILITY

The heat generation system of the present invention can be used to heat a fluid in an exhaust gas purification device using DPF or the like, and the exhaust gas purification device of the present invention can be installed in an automobile or the like equipped with a diesel engine or the like. Furthermore, the method for regenerating a honeycomb structure can be used for regeneration treatment of a honeycomb structure in an automobile or the like equipped with a diesel engine or a gasoline engine.

DESCRIPTION OF REFERENCE NUMERALS

1, 20, 30, 40, 50: heat generation system, 2: liquid storage tank, 3, 31: heating element, 4: liquid injection mechanism member, 5: discharge mechanism member, 7: liquid (water), 8: liquid storage space, 9, 34: storage space, 10, 32: reaction container, 11, 35: porous body, 12: liquid product, 13: vaporized material, 14: exothermic reaction solid, 15: liquid flow pipe, 16: injection valve (injection unit), 17: discharge pipe, 18: discharge valve (discharge unit), 19: discharge pump (discharge unit), 21: liquefying unit, 33a: inner cylindrical portion, 33b: outer cylindrical portion, 36a: inner peripheral surface, 36b: outer peripheral surface, 41, 51: honeycomb heat exchange unit (heat exchange unit), 60, 70, 80: exhaust gas purification device, 61a: one end face, 61b: other end face, 62: honeycomb structure, 63: structure accommodation space, 64: can body, 65, 67: spacer member, 66: can body outer shell portion, 66a: outer surface of outer shell portion, 81: catalyst loading honeycomb structure, and F, F': fluid.

What is claimed is:

1. A heat generation system comprising:
a liquid storage tank being configured to store liquid;
a heating element including:
a reaction container composed of a double tube structure comprising:
an inner cylindrical portion,
an outer cylindrical portion, which is provided separately on the outer side of the inner cylindrical portion, with the inner cylindrical portion and the outer cylindrical portion extending in parallel directions from one end to another end, which are opposite ends of the double tube structure, so as to have a gap interval therebetween, with two end portions extending in directions perpendicular to the extending directions of the inner and the outer cylindrical portions such that the two end portions respectively connect the inner cylindrical portion and the outer cylindrical portion at the opposite ends of the double tube structure to form an external shape of the reaction container having a storage space that is provided between the inner cylindrical portion and the outer cylindrical portion, and a porous body that has a single tubular shape, which has an inner cylinder shaped surface and an outer cylinder shaped surface, such that the singular tubular shape of the porous body is accommodated in the storage space that is provided between an outer surface of the inner cylindrical portion and an inner surface of the outer cylindrical portion of the double tube structure, and loaded with an exothermic reaction solid that causes an exothermic reaction when being in contact with the liquid;

a liquid injection mechanism member including:
 a liquid flow pipe that communicates between the liquid storage tank and the storage space of the reaction container, through which the liquid flows, and
 an injection unit that injects the liquid in the liquid storage tank into the storage space; and a discharge mechanism member including:
 a discharge pipe that communicates with the storage space of the reaction container, and
 a discharge unit that discharges a liquid product generated by the exothermic reaction caused by contact between the liquid and the exothermic reaction solid, and a vaporized material of the liquid, from the storage space through the discharge pipe.

2. The heat generation system according to claim 1, further comprising:
a liquefying unit that cools the discharged vaporized material to cause phase transition to the liquid; and
a liquid recovery unit that recovers the liquefied liquid in the liquid storage tank.

3. The heat generation system according to claim 1, wherein the exothermic reaction solid is
an alkaline earth metal element oxide or a mixture of a plurality of the alkaline earth metal element oxides.

4. The heat generation system according to claim 3, wherein the alkaline earth metal element oxide is a calcium oxide, and the liquid is water.

5. The heat generation system according to claim 1, wherein the porous body is
made of a ceramic material containing silicon and silicon carbide as main components.

6. The heat generation system according to claim 1, further comprising a heat exchange unit that at least partially abuts against an inner peripheral surface of the inner cylindrical portion of the reaction container, and is configured to transfer reaction heat generated by the exothermic reaction to the outside of the heating element.

7. The heat generation system according to claim 6, wherein the heat exchange unit is
a honeycomb heat exchange unit having partition walls defining a plurality of cells, the plurality of cells extending from one end face to the other end face to form a flow path of fluid.

8. An exhaust gas purification device having the heat generation system as defined in claim 1, the exhaust gas purification device comprising:
a honeycomb structure having partition walls defining a plurality of cells, the plurality of cells extending from one end face to the other end face to form a flow path of fluid;
a metal can body having a structure accommodation space capable of accommodating the honeycomb structure in the structure accommodation space; and
the heat generation system in which the heating element is disposed at an upstream position of the structure accommodation space, facing the one end face,
wherein the exhaust gas purification device having a regeneration function of introducing the fluid heated by the heating element from the one end face into the honeycomb structure, and removing particulate matter deposited inside the structure by the fluid.

9. The exhaust gas purification device according to claim 8,
wherein the honeycomb structure is
a plugged honeycomb structure including a plurality of plugging portions in which open ends of the cells in the one end face and/or the other end face are plugged in accordance with a predetermined arrangement standard.

10. The exhaust gas purification device according to claim 8,
wherein the honeycomb structure
is loaded with at least one catalyst of a selective reduction catalyst, a three-way catalyst, and a $NO_x$ storage type three-way catalyst on the surface of the partition wall and/or inside the partition wall.

11. A method for regenerating a honeycomb structure having the exhaust gas purification device as defined in claim 8, the method comprising:
a fluid introducing step of introducing fluid from the one end face into the honeycomb structure;
a fluid heating step of heating the fluid before being introduced into the honeycomb structure, using the heat generation system of the exhaust gas purification device; and
a regeneration treatment step of removing particulate matter deposited inside the structure by the heated fluid to regenerate the honeycomb structure.

12. The method for regenerating a honeycomb structure according to claim 11, wherein heating of the fluid or the honeycomb structure by the heat generation system is started simultaneously with the start of introduction of the fluid into the structure or before the start of introduction.

13. A method for regenerating a honeycomb structure having the exhaust gas purification device as defined in claim 8, the method comprising:
a fluid introducing step of introducing fluid from the one end face into the honeycomb structure accommodated in a metal can body;
a honeycomb structure heating step of heating the honeycomb structure through the can body, using the heat generation system of the exhaust gas purification device; and
a regeneration treatment step of removing particulate matter deposited inside the structure by the heated honeycomb structure and the fluid to regenerate the honeycomb structure.

14. An exhaust gas purification device having the heat generation system as defined in claim 1, the exhaust gas purification device comprising:

a honeycomb structure having partition walls defining a plurality of cells, the plurality of cells extending from one end face to the other end face to form a flow path of fluid;

a metal can body having a structure accommodation space capable of accommodating the honeycomb structure in the structure accommodation space; and the heat generation system in which the heating element is disposed so that the heating element at least partially abuts against an outer surface of an outer shell portion of a can body outer shell portion of the can body, or is partially embedded in the can body outer shell portion, wherein the exhaust gas purification device having a regeneration function of introducing the fluid from the one end face of the honeycomb structure heated by the heating element through the can body into the honeycomb structure, and removing particulate matter deposited inside the structure by the fluid.

15. The exhaust gas purification device according to claim 14, further comprising a heat conduction unit interposed between the honeycomb structure and the can body and formed of a thermally conductive material that transfers reaction heat generated by the heating element provided in the can body outer shell portion to the honeycomb structure.

16. A heat generation system comprising:
a liquid storage tank being configured to store liquid;
a heating element including:
a reaction container composed of a double tube structure comprising:
an inner cylindrical portion,
an outer cylindrical portion, which provided separately on the outer
side of the inner cylindrical portion, with the inner cylindrical portion and the outer cylindrical portion extending in parallel directions from one end to another end, which are opposite ends of the double tube structure, so as to have a gap interval therebetween, with two end portions extending in directions perpendicular to the extending directions of the inner and the outer cylindrical portions such that the, two end portions respectively connect the inner cylindrical portion and the outer cylindrical portion at opposite ends of the double tube structure so as to form an external shape of the reaction container having a storage space therebetween, and a porous body that is accommodated in the storage space such that the double tube structure has a substantially cylindrical shape, and the porous body is loaded with an exothermic reaction solid that causes an exothermic reaction when being in contact with the liquid;

a liquid injection mechanism member including:
a liquid flow pipe that communicates between the liquid storage tank and the storage space of the reaction container, through which the liquid flows, and
an injection unit that injects the liquid in the liquid storage tank into the storage space; and a discharge mechanism member including:
a discharge pipe that communicates with the storage space of the reaction container, and
a discharge unit that discharges a liquid product generated by the exothermic reaction caused by contact between the liquid and the exothermic reaction solid, and a vaporized material of the liquid, from the storage space through the discharge pipe.

* * * * *